United States Patent
Harakas

(10) Patent No.: US 12,348,434 B2
(45) Date of Patent: Jul. 1, 2025

(54) RESOURCE ALLOCATION DASHBOARD AND OPTIMIZATION GENERATOR

(71) Applicant: Wells Fargo Bank, N.A., San Francisco, CA (US)

(72) Inventor: Panayiotis Andrew Harakas, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 287 days.

(21) Appl. No.: 18/189,583

(22) Filed: Mar. 24, 2023

(65) Prior Publication Data

US 2024/0323140 A1 Sep. 26, 2024

(51) Int. Cl.
*H04L 47/78* (2022.01)
*H04L 41/16* (2022.01)
*H04L 43/045* (2022.01)
*H04L 47/70* (2022.01)

(52) U.S. Cl.
CPC ............ *H04L 47/781* (2013.01); *H04L 41/16* (2013.01); *H04L 43/045* (2013.01); *H04L 47/828* (2013.01)

(58) Field of Classification Search
None
See application file for complete search history.

(56) References Cited

U.S. PATENT DOCUMENTS

| | | |
|---|---|---|
| 9,830,660 B2 | 11/2017 | Dintenfass et al. |
| 11,270,375 B1 | 3/2022 | Jennings et al. |
| 2012/0030043 A1 | 2/2012 | Ross et al. |
| 2014/0310151 A1 | 10/2014 | Shishkov et al. |
| 2018/0123909 A1 * | 5/2018 | Venkitapathi ............ H04L 43/08 |
| 2019/0378207 A1 | 12/2019 | Dibner-Dunlap et al. |
| 2022/0337525 A1 * | 10/2022 | Iyer ........................ H04L 1/0002 |
| 2024/0171984 A1 * | 5/2024 | Montalvo ............. H04W 24/02 |

* cited by examiner

*Primary Examiner* — Angela Nguyen
(74) *Attorney, Agent, or Firm* — SCHWEGMAN LUNDBERG & WOESSNER, P.A.

(57) ABSTRACT

Disclosed in some examples are methods, systems, devices, and machine-readable mediums for resource allocation optimization systems that provide one or more interfaces that display an entity's resource allocation data from multiple sources in a single interface. Also disclosed in some examples are resource allocation optimization systems which provide resource allocation adjustments for an entity to optimize resources toward a resource optimization goal. The resource allocation optimization system groups similar entities using rule-based or artificial intelligence algorithms acting upon entity description data (including in some examples, resource allocation data) obtained from the entity and/or from external network-based services. The resource allocation optimization system uses resource allocation data of entities within a group to provide resource allocation adjustments to entities within the group via improved user interfaces. The resource allocation adjustments are selected to meet one or more resource optimization goals.

20 Claims, 8 Drawing Sheets

RESOURCE ALLOCATION DASHBOARD AND OPTIMIZATION GENERATOR

TECHNICAL FIELD

Embodiments pertain to resource allocations. Some embodiments relate to resource allocation dashboards where entities may view their resource allocations in one spot. Some embodiments relate to resource allocation optimizations. Further embodiments relate to resource allocation optimizations for a first entity based upon resource allocations of one or more second entities in an entity group.

BACKGROUND

Entities may store resources in one or more resource stores. New advancements in technology and in network communications have made finer-grained monitoring and allocation of resources stored in these resource stores possible. For example, entities can now monitor and update resource allocations in real-time or near real-time using network-based communications tools provided by network-based resource stores. These tools also enable entities to continuously track and optimize their resource allocation strategies by changing which resources are stored in which resource stores, moving resources between stores, and the like. Resource allocation strategies may be defined as an allocation of presently available and/or future expected resources to one or more resource stores. Since some resource stores may accrue additional resources as a function of time and an amount of resources allocated to the resource store, and other factors, sub-optimal resource allocation strategies implemented now may reduce a quantity of resources available to the entity in a future time frame.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
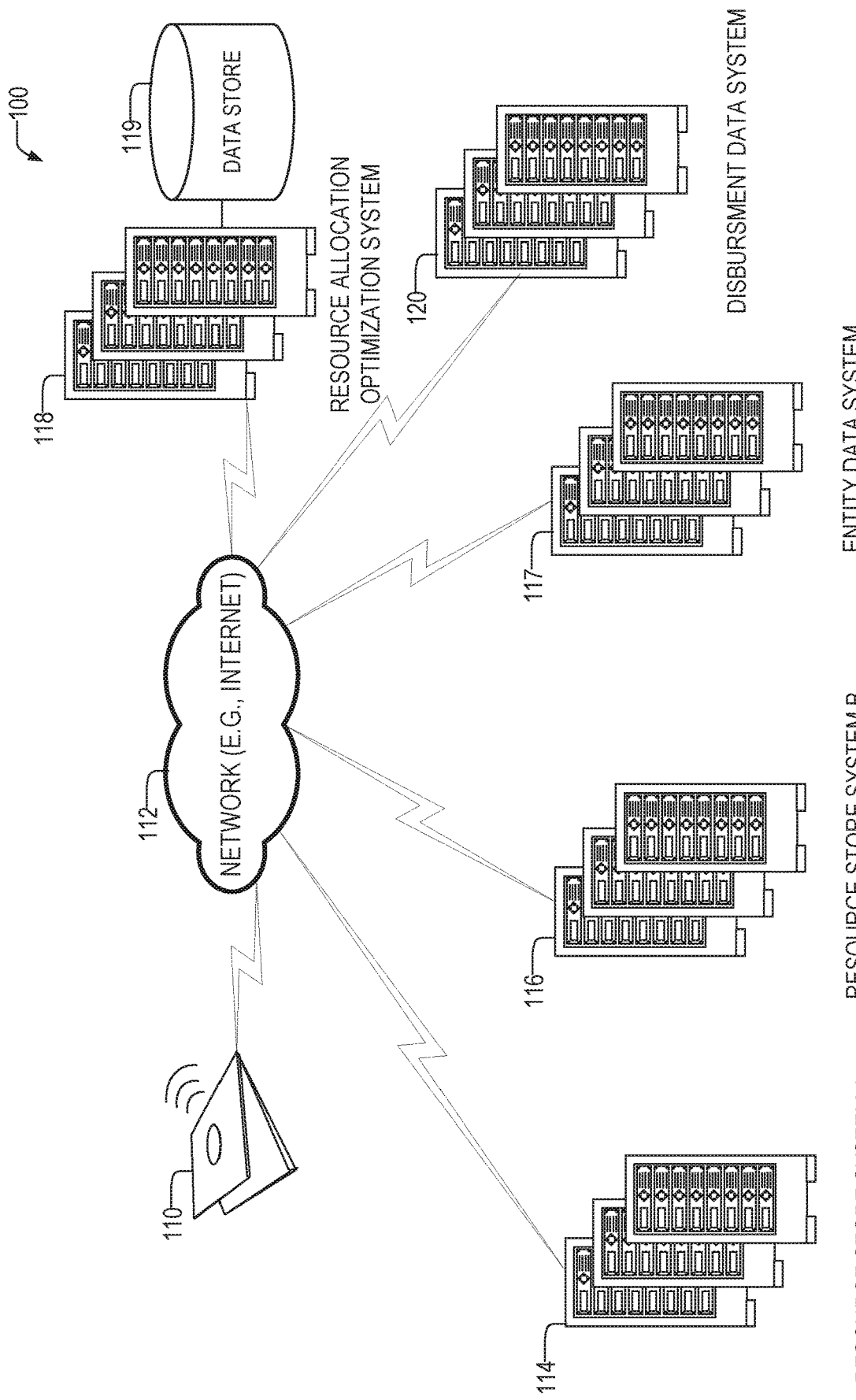
FIG. 1 illustrates an environment for resource allocation optimization according to some examples of the present disclosure.

As previously described, advancements in network technology and communications make it possible to have finer-grained monitoring of resource allocations. Despite this convenience, each network-based resource store system may have a different interface for monitoring and changing resource allocations. Entities having multiple resource allocations with different network-based resource allocation systems (hereinafter resource store systems) must contact multiple resource store systems to obtain the status of their resource allocations. This involves navigating to an application or network site, authenticating, and then navigating through the application or site to find the requisite information. This is both inconvenient for the entity, wastes time, and computing resources. Thus, the disparate resource allocation store systems present technical problems whereby an entity must contact separate resource allocation stores which waste network resources, computational resources, and the like. In addition, some entities utilize resource allocation advisors that assist the entity in resource allocations. These advisors may not always have the full picture of the resource allocations of an entity to offer objective and detailed advice.

Further, and as already noted, effective resource allocation strategies are important to manage resources now and also for future usage. Finding an optimal resource allocation strategy is not always straightforward. One way that entities look to find optimal resource allocation strategies may be to compare resource allocation strategies of the entity to similar entities to spot differences in resource allocations. An entity may identify incorrect or sub-optimal resource allocation strategies through these comparisons. Properly developing a resource allocation strategy using comparison data presents technical problems in properly finding similar entities to serve as a point of comparison. If the chosen entity is not similar enough to the entity, the resource allocations and/or resource optimization goals will not be similar enough to serve as an effective comparison tool. Another technical problem is that, even given an appropriate comparison entity, using the resource allocations and strategies of other entities to provide resource allocation adjustments to an entity may not be straightforward. For example, while the entities may be similar, the entities resource allocations may not be exactly the same. Subtle differences in resource amounts, distributions, and other circumstances may make one strategy unsuitable for a particular entity and may make it difficult to turn comparison data into an optimization strategy given a particular resource optimization goal.

Disclosed in some examples are methods, systems, devices, and machine-readable mediums for resource allocation optimization systems that provide one or more interfaces that display an entity's resource allocation data from multiple sources in a single interface. These interfaces may be provided to the entity and/or their advisor. Also disclosed in some examples are resource allocation optimization systems which provide resource allocation adjustments for an entity to optimize resources toward a resource optimization goal—these adjustments may be provided to the entity or their advisor. Also disclosed in some examples are GUIs that display a resource allocation health metric, calculated relative to a group of related entities.

The resource allocation optimization system groups similar entities using rule-based or artificial intelligence algorithms acting upon entity description data obtained from the entity and/or from external network-based services. The resource allocation optimization system uses the entity description data (which includes entity resource allocation data) of entities within a group to provide both comparisons to other entities in the group as well as proposed resource allocation adjustments via improved user interfaces. The resource allocation adjustments are selected to meet one or more resource optimization goals. The resource optimization goals may be provided by the entity or may be inferred using entity description data. The improved user interfaces may allow an entity to quickly reallocate resources according to suggested resource allocation adjustments, such as transferring resources from a source resource store to a destination resource store.

As a specific example of the resource allocation optimization system, the system may provide an individual with a single view of all their financial products, such as investments, savings, checking, credit cards, and the like. In addition, the resource allocation optimization system may group individuals or families with other similar individuals or families and provide comparisons between the user and other members of the group. In addition, the system may provide actionable investment and savings strategies based upon differences in the user's finances and other members of the group to help the individual or family achieve a particular financial goal, such as a retirement goal, savings goal, or the like.

Entity grouping operations of the resource allocation optimization system may group similar entities together in an entity group. Similarity may be determined using entity description data that may be gathered directly from the entities, gathered from network-based services, inferred from data gathered directly, or the like. Entity description data may be data that is descriptive of an entity and may include entity demographic information, entity resource allocation data, entity resource disbursement data and the like.

Entity demographic information may include entity name, age, location, marital status, information about children or other dependents (as well as demographic information about the children or dependents), information about spouses or partner, neighborhoods, regions, resource optimization goals of the entity, entity social media information, and the like. Entity social media information may be used to determine or infer one or more resource optimization goals, demographic information, and the like. In addition, entity social media information may be used to group entities. For example, entities posting about similar topics may be grouped together.

Entity resource allocation data may include an amount of resources in one or more resource stores—such as an amount of resources in each particular resource store (e.g., account), resource replenishment data (e.g., amount and frequency of resources assigned or transferred to the entity), and the like. For example, resource replenishment data may include timing and amount data of resource replenishment of resource stores. Example replenishments include paychecks, transfers, gifts, and other irregular or regular income. Replenishment data includes timing (e.g., periodicity) and amount of replenishment as well as which resource stores the resource replenishments are assigned to. Resource disbursement data may any resource obligation that is disbursed from a resource store. For example, bills and obligations such as mortgage payments. Resources in a resource store may be resources owned by the entity, such as a savings or checking account balance; or resources may be credit resources of available or used credit, such as a credit card balance and/or available credit, lines of credit, personal loans, and the like.

The entity grouping algorithms may utilize specified rulesets (such as if-then rules), machine learned models, or the like that use the entity description data of entities as input to decide as to which group an entity belongs. Example machine-learning algorithms include machine-learned clustering algorithms. In some examples, the clustering algorithms may be supervised in that each entity may have a label of which group the entity should be placed into. The label may be determined by an administrator, or by entities themselves in the early stages of an example implementation. That is, in the early stages of deployment, users may pick the entity group they feel they best belong in. This label, along with the entity description data may be used to train a model that may be used during later stages, where an entity group may be suggested or assigned automatically based upon the model. In other examples, the machine-learning algorithm may be unsupervised.

As previously discussed, the resource allocation optimization system may provide a summary comparison between the resource allocation data of the entity and resource allocation data of other entities within an entity group, such as in a graphical user interface (GUI), or programmatically through an Application Programming Interface (API). The GUI may be provided to the entity being compared, or to one or more advisors of the entity. One or more summarization rules may transform resource allocation data from one or more other entities of the group into a summary that is then compared to the entity. The summary may be a resource allocation health score or metric that grades the entity's resource allocations against other entities within the entity group. In some examples, the score may be determined by a machine-learning algorithm.

In other examples, the summary may be statistics such as that "X % of similar entities have more than 20% of their income assigned to savings." The rules may specify one or more summary metrics of the group's resource allocations. These summary metrics may be compared with the metrics of the entity's resource allocations. The comparisons which show performance of the entity that is within a threshold similarity to the group's performance may be indicated as such. Comparisons which show performance of the entity that is not within the threshold similarity may be reported as an outlier.

In some examples, the resource allocation optimization system may automatically calculate an optimal resource allocation adjustment for a particular entity given the entity description data (including the entity resource allocation data) for the particular entity and the entity description data (including the entity resource allocation data) for one, one or more, or all entities in a particular group. This may be done using specified rulesets, supervised or unsupervised machine learning, or the like. For example, the resource allocation adjustment may be selected to optimize an entity's resources to achieve a resource optimization goal. Resource optimization goals include a desired quantity of future resources, a desired quantity of current resources, a reduction in resource debt, and the like. For example, a resource optimization goal may include a desired retirement income and age, a desired savings for college for one or more children or dependents, a desired savings for a home, a desired savings for a car, a desired amount of investment income, a desired amount of business income, a desired amount of rental income, a desired amount of debt reduction, and the like. The resource allocation adjustment may include reallocating adjustments of resources from a first resource store to a second resource store to achieve a future predicted amount of resources in order to achieve the particular resource optimization goal.

In some examples, the system may provide multi-factored optimization strategies to optimize resources for multiple resource optimization goals. In these examples, the entity may rank each resource optimization goal in terms of importance, or timing. The system may then utilize the resource optimization goals along with the entity description data of the entity and other entities within the group to produce a resource allocation adjustment designed to optimize an entity's resources to achieve all of, or the maximum amount possible of the resource optimization goals, given the rankings.

In some examples, the resource optimization goals are prespecified. In other examples, the resource optimization goals may be specified or set by the entity. In yet other examples, the resource optimization goals may be inferred—e.g., from social media posts of the entity. In still yet other examples, the resource optimization goals are set based upon the resource optimization goals of other entities in the group of entities. That is, if an entity is allocated to a particular entity group, the system may assign a particular resource optimization goal based upon membership in that entity group. For example, if the entity is a person, and if the entity is a married father of three young children, and the entity group has similar individuals, and if a majority of those similar individuals have a resource optimization goal of saving for college, this resource optimization goal may be assigned to that entity. Put differently, the system may predict the resource optimization goals of an entity based upon the resource optimization goals it already knows about from other similar entities. This may be accomplished by using one or more rule-based algorithms or one or more supervised or unsupervised machine-learning algorithms. These resource optimization goals may be changed at a later time by entities and this feedback may be applied to future predictions (such as additional training data to the machine-learning algorithm).

Alternatively, the resource optimization goals may be used in the rulesets and/or machine-learning to group entities. That is, instead of using the group to set the resource optimization goals, the resource optimization goals are used to select the group. For example, entities may also be grouped based upon similar or desired optimization goals. That is, an entity wishing to maximize a quantity of resources in a particular resource store at a particular future timeframe may be grouped together with entities with similar optimization goals or may be grouped with entities that have previously achieved the resource optimization goals. In the latter examples, historical resource allocation data of the entities that have previously achieved the resource optimization may be used to suggest resource allocation adjustments in order to obtain the resource allocation optimization specified by the goals. That is, if entity A previously has obtained a savings of B resources in resource store C by year D, and entity E has resource optimization goals of saving B resources (wherein B may be a range) in resource store C (or similar resource stores) by year G, and the current year is year F, resource allocation data from entity A from year (D-(F-G)) may be utilized to suggest optimization strategies for entity E.

The present disclosure thus solves the technical problem of determining an optimal resource allocation adjustment to achieve one or more resource optimization goals by using a technical solution of grouping of like entities and utilizing the resource optimization strategies of those like entities to create resource allocation adjustments. The combined steps of grouping and analyzing resource allocation strategies of the group to reconfigure one entity in the group removes individual entity decision making and replaces it with crowd-sourced optimization adjustments that achieves resource optimization strategies that outperform individual entity decision-making.

In addition, the present disclosure solves the technical problem of multiple user interfaces and wasted networking and computing resources inherent in accessing multiple different network-based resource store systems to monitor resource activity by using the technical solution of presenting a single interface to view all resource allocations across different systems. This provides for rapidly accessing and processing information and increases the efficiency of a user interface by allowing the user to locate information of interest conveniently and rapidly. The disclosed techniques spare users of the time-consuming operations of navigating to, opening up, and then navigating within, each separate resource store's network-based interface. The disclosed techniques thus recite specific improvements to the way computers operate.

In some examples, resources may include data in a data structure, such as data indicating ownership of currency (such as cash or equivalents), credit, stocks, bonds, property, or the like. Resources may also be a debt owed or an amount of remaining credit. In some examples entities may be individual users, families, organizations, businesses, and the like. In some examples, resource stores may be data stores such as accounts, brokerage accounts, bond accounts, property portfolios, credit card accounts, mortgage accounts, loan accounts, and the like. Resource allocation data may comprise data describing resources in one or more resource stores and/or data describing resource debts owed by the entity. Adjustments of resource allocation strategies may include changes to resource allocations, such as moving resources from a first resource store to a second resource store, changing an allocation of future resources (e.g., to put more future resources in a first resource store), and the like. In these examples, the present disclosure may improve the financial health of an individual, business, or other entity. A person of ordinary skill in the art, having the benefit of the present disclosure, will recognize that the inventive techniques disclosed herein may be applied across a wide range of applications that is not limited to computing or financial optimizations. That is, the techniques disclosed herein may apply just as equally to computing resources such as processor time (e.g., for scheduling processes), and the like.

FIG. 1 illustrates an environment 100 for resource allocation optimization according to some examples of the present disclosure. Environment 100 may include entity computing device 110, resource store system A 114, resource store system B 116, entity data system 117, resource allocation optimization system 118, data store 119, and disbursement data system 120. The components of FIG. 1 may be in communication with each other across a network 112. Network 112 may include a packet-based network, a circuit switched network, or the like. Examples of network 112 may be or include a Local Area Network, a Wide Area Network, a Metropolitan Area Network, the Internet, and the like. Two or more systems of FIG. 1 may be combined into one system, or any system shown in FIG. 1 may be further broken up into more than one system. For example, the resource allocation optimization system 118 may also perform the functions of one or more of resource store system A 114, resource store system B 116, entity data system 117, and/or disbursement data system 120. Disbursement data system 120 may provide data about resource disbursements made in the past and obligations to make disbursements of resources in the future about an entity. For example, a bill-pay system.

Resource allocation optimization system 118 may obtain entity data about an entity, such as the entity operating entity computing device 110 from data store 119, entity data system 117, resource store system A 114, resource store system B 116, and the like. Example entity data may include entity demographic information, entity resource allocation data (including resource debts), entity resource disbursement data, and the like. Demographic information may include an entity name (e.g., a user's name), age, marital status, partner demographic information, dependent information (including demographic information on dependents), resource optimization goals, home location, and the like. Additional example entity data may include social networking information, such as demographic data from social networking services, social network posts, friend, connection, and contact information on social networks, and the like. Social networking data may be used to infer one or more resource optimization goals, demographic information, entity resource allocation data, and the like. Entity data system 117 may include a social networking service, credit score system, market information systems, investment modelling systems, or any other external system providing information about an entity. In some examples, the entity data may include data provided by the entity. For example, an entity may register with the resource allocation optimization system 118 and provide demographic and other data. In some examples, the entity may provide one or more authentication credentials to access resource store systems, entity data systems, and/or disbursement data systems where the entity has stored resources, data about the entity, and the like.

The resource allocation optimization system 118 may determine entity resource allocation data of one or more entities, such as an entity operating the entity computing device 110. For example, by accessing a data structure in a data store communicatively coupled to the resource allocation optimization system, such as data store 119. For example, the data structure may indicate resources present in one or more accounts associated with the entity. Thus, the resource allocation optimization system 118 may function as a resource store. In other examples, the resource allocation optimization system 118 may contact one or more external resource store systems, such as resource store system A 114, and resource store system B 116. Example external resource store systems may include financial institutions, banks, brokerage firms, and the like. In addition, the resource store systems may include information on resource debts owed by the entity, such as credit card balances.

A user or other entity may sign up for the resource allocation optimization system 118, create a user profile, and input a plurality of financial products that they own—regardless of the service which manages the financial products. The user may then enter the credentials for each service corresponding to each of the plurality of financial products, or otherwise authorize the resource allocation optimization system 118 to access the user's accounts on the system. The resource allocation optimization system 118 may then obtain up-to-date and accurate information on the resource allocations of the user.

The resource allocation data identified by the resource allocation optimization system 118 may be periodically refreshed or refreshed on-demand (e.g., as requested by the entity) by the resource allocation optimization system 118. Resource allocation optimization system 118 may provide resource allocation information for resources stored on one or more of the disparate resource store systems, such as resource store system A 114, resource store system B 116, and the like on a GUI provided to the computing device of the entity or to an advisor of the entity. The GUI may also show resource debts, from resource credit systems, such as a credit card system. This allows an entity to view, in one place, their resource allocation health—regardless of the system on which those resources are managed.

For example, the GUI may be a dashboard showing current resource levels, resource trends for each resource source, expected future resource levels, resource debts, and the like. These GUIs provide enhancements to the functioning of the computing devices by putting together information about resources of the entity in a single location that may be quickly accessed and viewed. This allows the entity or advisor to quickly ascertain their resource levels across systems without having to log-in separately to each system and navigate to the page of that system where their resource levels are shown. By providing one interface, the user interface is simplified and computing resources are reduced by virtue of the shorter time to achieve the objective of viewing resource levels and by the reduced number of network accesses necessary to achieve the same objective.

As noted, social networking data may be used for various purposes. In some examples, the social networking data may be analyzed using one or more machine-learning algorithms, such as Natural Language Processing (NLP) algorithms to determine entity data from posts. Example information determined includes life events such as marriage, divorce, childbirth, bankruptcy, medical diagnosis, and the like. Other information may include resource utilization topics of interest such as stocks, bonds, and the like. This information may be used to group this entity with other entities with similar topics of interest or to determine resource optimization goals. For example, a detected life event of an entity having a child may trigger assigning a resource optimization goal of saving for college. Likewise, identifying a new child may cause the entity to be grouped with other entities that are also new parents. Friends and other connections on the social networking service may also be used to determine groups of similar entities. For example, if two entities are friends on a social networking service, the system may be more likely to group them together. Social networking information may also be used to determine resource optimization goals. Natural Language Processing (NLP) algorithms, such as Latent Dirichlet algorithms may be used to evaluate social networking data (such as posts) to determine a latent topic of social networking posts of the entity. If the number of posts about a particular topic exceeds a threshold, the system may utilize that topic in grouping the entity and/or in assigning resource optimization goals.

As previously described, the resource allocation optimization system utilizes the entity data collected to create entity groups. Entity groups may be based upon similarities of the entity data of entities within the group. In addition, and as already noted, entity groups may be created based upon similarities in resource optimization goals. For example, a resource optimization goal may be a particular amount of resources in a particular account (e.g., a target amount of savings) at a particular age of the entity (e.g., retirement age). Other entities with similar goals (e.g., within a specified target savings amount, a specific target savings purpose such as college, and/or target retirement age) may be similarly grouped.

In some examples, entities may have multiple resource optimization goals targeting one or more different resource types. For example, savings resources, stocks and bonds resources, and the like. In these examples, the entity may be grouped into different entity groups for each of the different resource optimization goals. In addition, the entity may be regrouped as the resource optimization goals are updated (e.g., by the entity).

The resource allocation optimization system 118 may utilize one or more rule-based algorithms that utilize pre-specified rules; machine learning algorithms; or the like to produce resource allocation adjustments to enact resource allocation optimizations to move resource allocations toward the resource optimization goals. Resource allocation optimizations may include moving resources from one resource store to another resource store. For example, by suggesting that a user save more money in a savings account rather than leaving it in checking where it may be spent in order to save for retirement. Example rules may include if-then rules, decision trees, decision forests, and the like. These optimizations may be delivered to the entity's computing device, such as entity computing device 110. For example, through a GUI on the entity computing device 110 or a computing device of an advisor of the entity. The GUI may be provided by the resource allocation optimization system 118.

Figure 2:
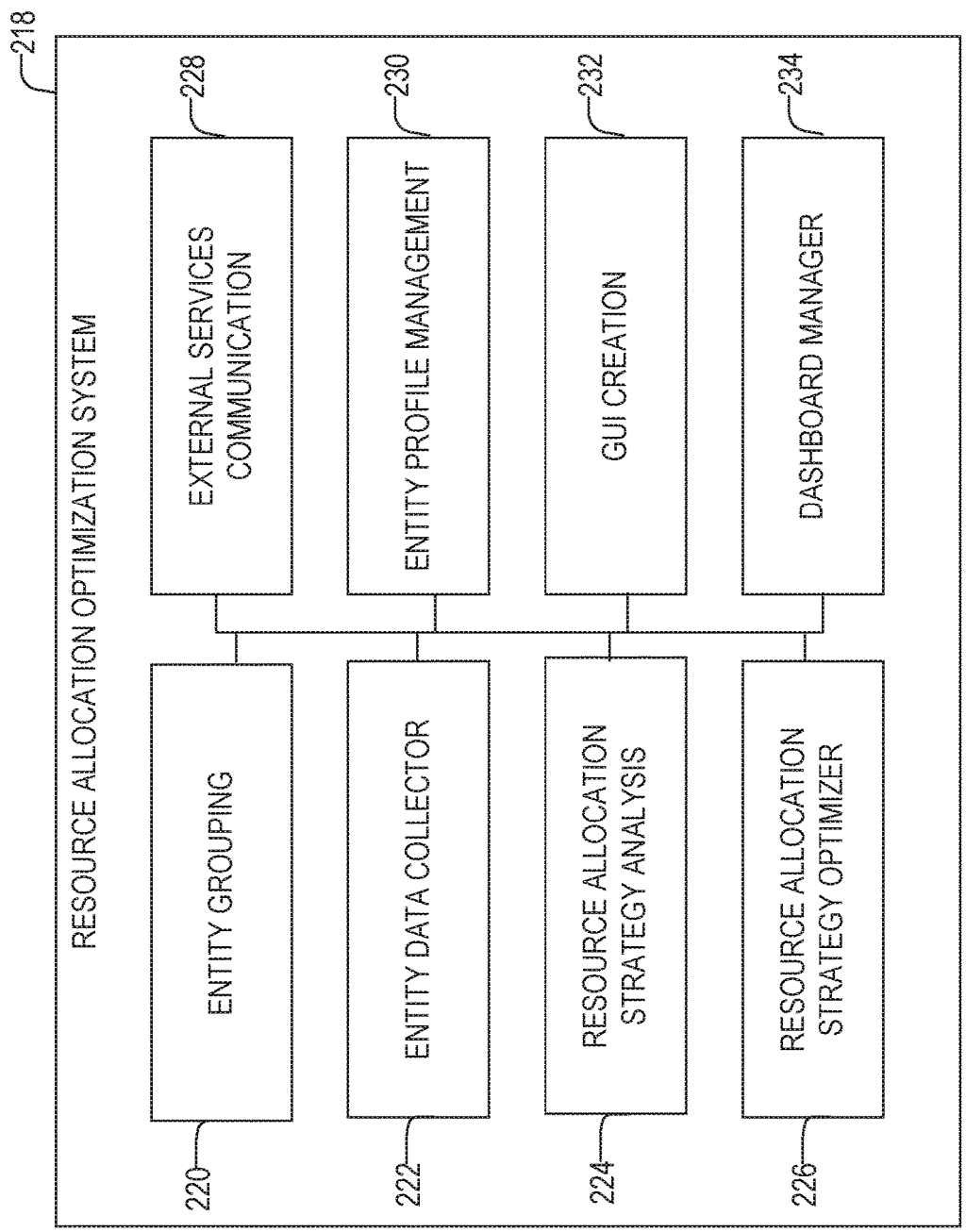
FIG. 2 illustrates a resource allocation optimization system according to some examples of the present disclosure.

FIG. 2 illustrates a resource allocation optimization system 218 according to some examples of the present disclosure. In some examples, resource allocation optimization system 218 is an example of resource allocation optimization system 118. The resource allocation optimization system 218 is exemplary and one of ordinary skill in the art with the benefit of the present disclosure will appreciate that the functions of one or more of the components shown in FIG. 2 may be combined or split into separate components. In addition, while shown as being on a same system, the components may be physically implemented on one or more devices, that may be communicatively coupled by either a local or remote connection.

Entity profile management component 230 may, through GUIs produced by the GUI creation component 232, an Application Programming Interface, or another interface, allow entities to create accounts with the resource allocation optimization system. The account creation includes creation of one or more data structures tracking data on the entity. This data may include data about internal and/or external services used by the entity. The data may include authentication and/or authorization data for those services. Example services may include social networking services, external resource store services, and the like. An entity may authorize the resource allocation optimization system 218 to access the entity's accounts on these services. The authorization may generate one or more authentication and/or authorization tokens that are used by the external services communication component 228 in API calls to access data about the entity. In other examples, the user provides a username and password for these services that are then used by the external services communication component 228. Other data tracked that may be entered by the entity may include entity data, resource information, resource-goal information, and the like.

Entity data collector component 222 may utilize the data about the entity obtained by the entity profile management component 230 to determine entity description data such as demographic information, resource allocation data, disbursement data, and the like. This data may be obtained directly from the entity's profile created and managed by the entity profile management component 230 or indirectly by contacting other databases, data services and the like listed as having entity description data in the entity profile. As noted, the entity data collector component 222 may utilize the external services communication component 228 to obtain data and information about the entity from external services. For example, the external services communication component 228 may utilize an API to communicate with one or more external services. Data collected about the entity from these services may be stored in the entity's profile by entity data collector component 222 and entity profile management component 230.

Entity grouping component 220 may utilize the data collected about the entity by entity data collector component 222 to group the entity with one or more other entities into entity groups as previously discussed. As noted, groups may be created using machine-learning or rule-based groupings. Example rules may include grouping entities meeting specified rule-based criteria. Criteria may be created using any of the entity description data. For example, rules may cause all entities that are between 35 and 40 years old, married, with two kids, earning between $50,000 and $75,000 a year and having less than $35,000 saved for retirement to be grouped together.

In other examples, various machine-learning algorithms may group entities based upon the entity description data and/or resource-goal data. In some examples, the machine-learning algorithms may be a clustering algorithm such as a multivariate clustering algorithm that finds clusters where all the features of each entity within each cluster are as similar as possible and where all the clusters themselves are as different as possible. One specific example may be a K-means clustering.

Resource allocation strategy analysis component 224 may produce one or more analysis of the resource allocations of a particular entity as compared to other entities within the group. As noted, this may be done using one or more rule-based methods or based upon machine-learning algorithms. In some examples, the system may use one or more Monte Carlo techniques to compare entities amongst the group. Comparisons may present a relative stance showing how an entities resource allocation health compares with others in the group. Analysis may include a comparison or summary of the resource allocation data of other entities within an entity group to an entity—e.g., in a graphical user interface (GUI). For example, one or more summarization rules may transform resource allocation data from one or more other entities of the group into a summary. For example, the summary may indicate that "X % of similar millennials have more than 20% of their income assigned to savings, consider increasing what you donate to savings by taking the train everyday instead of your car."

Resource allocation strategy optimizer 226 may utilize one or more of: resource optimization goals, outputs of the strategy analysis, and entity description data to produce one or more resource allocation optimizations that would move the entity closer to reaching the resource optimization goal. For example, an individual may wish to have $X saved for retirement in Y years. The system may provide one or more recommendations for achieving this goal. The recommendations may be automatically implemented, implemented after entity confirmation, and the like. Recommendations may be made using one or more rules, machine-learning algorithms, and the like. The resource allocation optimizations may be provided to either the entity or an advisor.

GUI creation component 232 may compose one or more GUIs of the resource allocation optimization system 218. The GUI creation component 232 may create one or more GUI descriptors that may be sent to an entity's computing device or an advisor's computing device where it is rendered to produce the GUI. GUI descriptors may be one or more data structures or files that, when interpreted by an application, instruct the application to render a GUI. Example GUI descriptors include Hypertext Markup Language (HTML) files, extensible Markup Language (XML) files, script files, JavaScript files, Java files, Cascading Style Sheets (CSS), information for display in a specified GUI, and the like. Applications may include a browser or a dedicated application. The dedicated application may have portions of the GUI already specified in the instructions of the application that may be supplemented by information in the GUI descriptors sent by the GUI creation component 232.

The created GUIs may present resource allocation data from one or more resource stores. For example, the GUI creation component 232 and the dashboard manager component 234 may create a dashboard, such as that shown in FIG. 5, that shows the resource management health of an entity at a glance. This dashboard may provide a single view of the resource allocations of an entity across multiple systems.

The created GUIs may also present the analysis of the resource allocation strategy analysis component 224 as well as the resource allocation strategy optimizer 226. The GUI created by the GUI creation component 232 may also allow entities to reallocate resources, e.g., such as a reallocation consistent with the optimized strategy determined by the resource allocation strategy optimizer 226. For example, by clicking or selecting a single option, one or more resources may be re-allocated. This may be done across computing systems—such that a transfer of resources is facilitated. For example, the external services communication component 228 may contact a first service (e.g., resource store system A 114) to transfer resources to a second service (e.g., resource store system B 116). In some examples another service, such as a transfer service (which may be implemented on or as part of the resource allocation optimization system 218) may be used to facilitate the transfer. For example, a resource transfer service such as Automated Clearing House, Wire Transfer, and the like.

In some examples, dashboard manager component 234 and GUI creation component 232 may create a dashboard for a third party. For example, an advisor may have a dashboard showing resource allocations for all the entities that the advisor advises. The advisor may utilize the dashboard to view a resource allocation health of entities the advisor advises.

In some examples, the entity groupings may be one way of assigning entities to advisors. Information about the advisor may be used in the clustering as a way of grouping entities to advisors similar to the entities. Information about the advisor used to group entities with an advisor may include the same information used to group entities.

Figure 3:
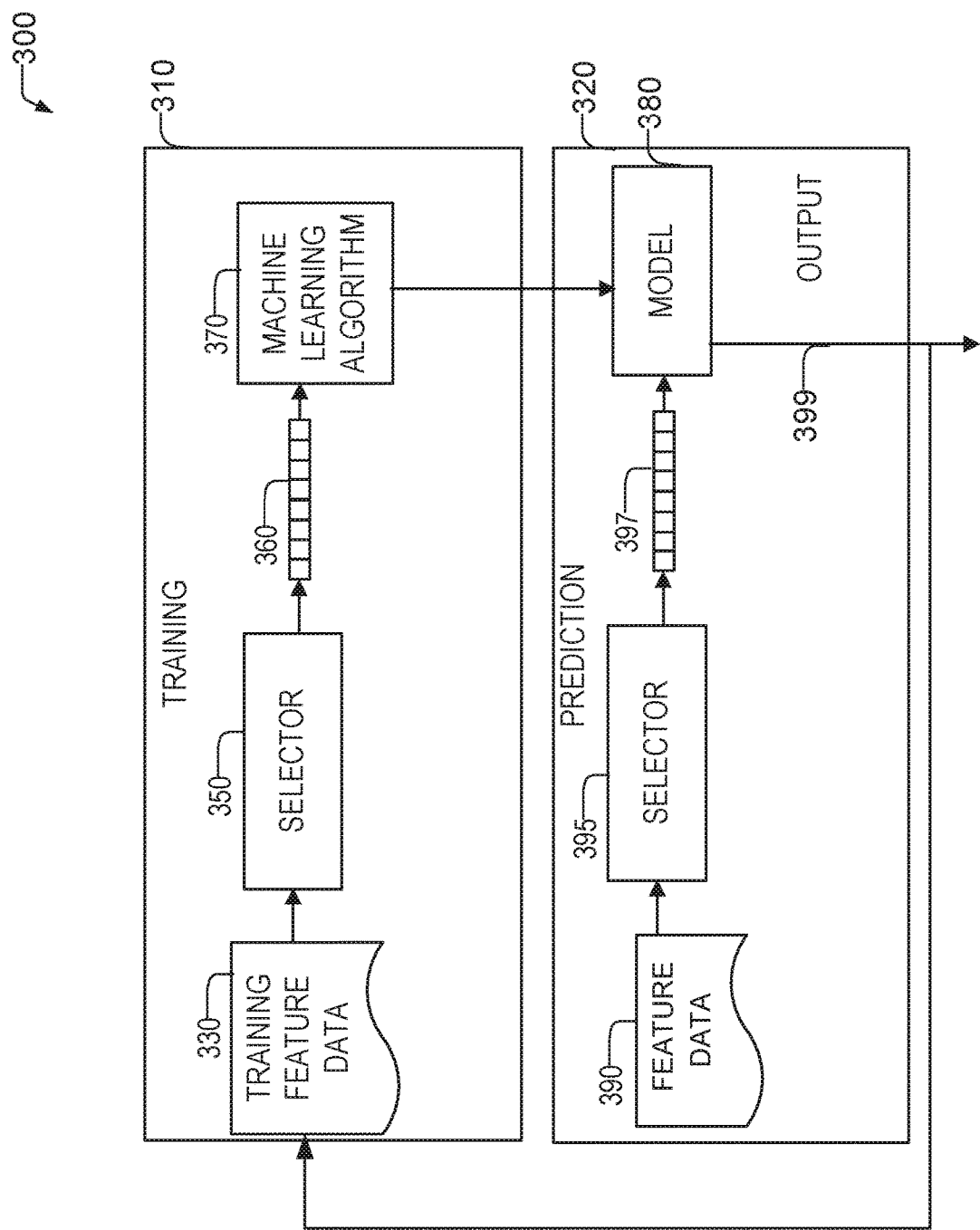
FIG. 3 shows an example machine learning module according to some examples of the present disclosure.

As previously noted, the system may utilize one or more machine-learning algorithms, for example, to interpret data (e.g., such as social media posts), group entities, identify comparison information, and present actionable resource allocation optimizations. FIG. 3 shows an example machine learning module 300 according to some examples of the present disclosure. The machine learning module 300 may be implemented in whole or in part by one or more computing devices. In some examples, the training module 310 may be implemented by a different device than the prediction module 320. In these examples, the model 380 may be created on a first machine and then sent to a second machine.

Machine learning module 300 utilizes a training module 310 and a prediction module 320. Training module 310 inputs training feature data 330 into selector module 350. The training feature data 330 may include one or more sets of training data. The training feature data 330 may be labeled with the desired output. In other examples, the training data may not be labeled, and the model may be trained using unsupervised methods and/or feedback data—such as through a reinforcement learning method. The feedback data may be a measure of error between a desired result of the algorithm and the actual result.

Selector module 350 converts and/or selects training vector 360 from the training feature data 330. For example, the selector module 350 may filter, select, transform, process, or otherwise convert the training data. For example, the selector module 350 may apply one or more feature selection algorithms to find features in the training data. The selected data may fill training vector 360 and comprises a set of the training data that is determined to be predictive of a result. Information chosen for inclusion in the training vector 360 may be all the training feature data 330 or in some examples, may be a subset of all the training feature data 330. Selector module 350 may also convert or otherwise process the training feature data 330 such as normalization, encoding, and the like. The training vector 360 may be utilized (along with any applicable labels) by the machine learning algorithm 370 to produce a model 380. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 320, feature data 390 is input to the selector module 395. Selector module 395 may operate the same, or differently than selector module 350. In some examples, selector modules 350 and 395 are the same modules or different instances of the same module. Selector module 395 produces vector 397, which is input into the model 380 to produce an output 399. For example, the weightings and/or network structure learned by the training module 310 may be executed on the vector 397 by applying vector 397 to a first layer of the model 380 to produce inputs to a second layer of the model 380, and so on until the encoding is output. As previously noted, other data structures may be used other than a vector (e.g., a matrix).

The training module 310 may operate in an offline manner to train the model 380. The prediction module 320, however, may be designed to operate in an online manner. It should be noted that the model 380 may be periodically updated via additional training and/or user feedback. For example, additional training feature data 330 may be collected as users provide feedback on the performance of the predictions.

The machine learning algorithm 370 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

As noted, the machine learning module 300 may intelligently interpret data, such as social media posts. In these examples, the training and feature data 330 and 390 may include the data for interpretation (such as social media posts). The training feature data 330 for training may be labeled using the correct interpretation of the data (e.g., a topic of the social media posts). Other machine-learning algorithms may utilize other training data or no training data. The output 399 may be an interpretation of the data, such as a latent topic of a social media post, or the like.

In addition, the machine learning module 300 may group entities. In these examples, the training and feature data 330, 390 may be one or more of entity description data, entity resource allocation data (including resource debt data), entity resource disbursement data, or the like of one or more entities. The feature data 390 may be the entity description data, entity resource allocation data, entity resource disbursement data of an entity being grouped. In some examples, for supervised learning methods, the training feature data 330 may be labeled with an optimal grouping from a plurality of specified groups. In the prediction module 320, the output 399 may be a group identifier.

In addition, the machine learning module 300 may identify resource allocation comparison information. That is, the output may be information regarding differences between a particular entity in a group and resource allocation information of other entities in the group. In these examples, the training and feature data 330, 390 may be one or more of entity description data, entity resource allocation data (including resource debt data), entity resource disbursement data, or the like. The output 399 may be one or more resource allocation differences. Example machine-learning models may include a support vector machine, a Principal Component Analysis (PCA)-based algorithms, or the like. The output 399 may be used to present one or more comparisons displayed to an entity or their advisors in a GUI.

In addition, the machine learning module 300 may identify resource allocation optimizations. That is, the output may be information regarding ways to optimize the entity's resource allocations. In these examples, the training and feature data 330, 390 may be one or more of entity description data, entity resource allocation data (including resource debt information), entity resource disbursement data, resource optimization goals, or the like. The output 399 may be one or more resource allocation optimizations. Example machine-learning algorithms may include genetic algorithms (where the fitness of a particular solution is evaluated using the goals), Monte Carlo simulations (which may utilize random adjustments to resources and run various financial simulation algorithms to predict results), stochastic programming, and the like. In some examples, the training data may be labelled with whether a particular entity's data in the training set illustrates good resource optimization or bad resource optimization (e.g., labelled using a manual review).

In yet other examples, the machine learning module 300 may identify an entity representation (e.g., a financial advisor). In these examples, the training and feature data 330, 390 may be one or more of entity description data, entity resource allocation data (including resource debt data), entity resource disbursement data, resource optimization goals, entity representative description data, or the like. The output 399 may be an identification of an entity representative. In some examples, for supervised learning methods, the training feature data 330 may be labeled with an optimal representative from a plurality of specified representative. In the prediction module 320, the output 399 may be a representative identifier.

As previously described, the machine learning module 300 may calculate one or more scores that indicate a resource allocation health. In these examples, the training and feature data 330, 390 may be one or more of entity description data, entity resource allocation data (including resource debt data), entity resource disbursement data, resource optimization goals, entity representative description data, an entity group identifier or the like. The training feature data 330 may be a ranking of the entities represented by the training feature data within their grouping. The output may be a score which indicates a relative resource health of the entity represented by the feature data 390 relative to other entities within the group. An example model may be a regression model.

Figure 4:
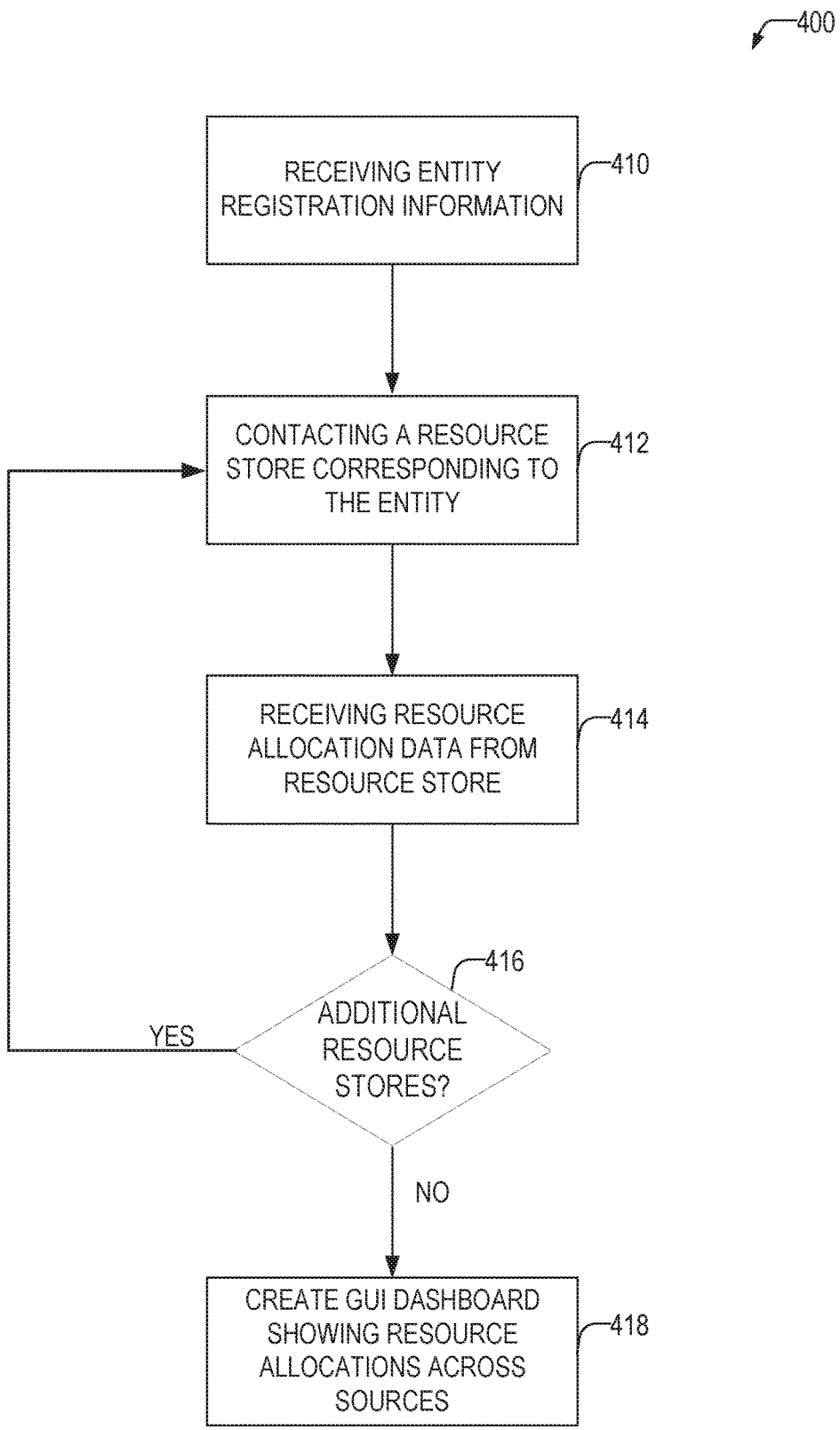
FIG. 4 illustrates a flowchart of a method of providing a GUI to an entity or advisor showing their resource allocations across a plurality of different resource stores according to some examples of the present disclosure.

FIG. 4 illustrates a flowchart of a method 400 of providing a GUI to an entity or their advisor showing their resource allocations across a plurality of different resource stores according to some examples of the present disclosure. At operation 410 the resource allocation optimization system (such as resource allocation optimization system 218) may receive entity registration information. For example, an entity may register with the resource allocation optimization or otherwise provide information to the resource allocation optimization. This information may include information about resource allocations of the entity, resource debts owed by the entity (or sources to discover resource debts of the entity), and the like. The information may include authentication and/or authorization information to allow the resource allocation optimization system to contact those sources to obtain information about the resources the entity stores there. For example, to obtain information on resource accounts held by the entity with the resource store such as a current balance, transaction histories, and the like.

In some examples, the resource allocation optimization system may reward an entity with additional resources for providing resource store information. That is, the more the resource allocation optimization system knows about an entity, the better the groupings and optimization predictions. Thus, the resource allocation optimization system may provide resource credits within an account of the entity in an amount based upon the number of resource stores, social media services, and other information that is given to the resource allocation optimization system.

At operation 412 the system may contact one of the resource stores identified in operation 410. The system may utilize one or more APIs of the resource store to contact the resource store programmatically. The APIs may be programmed manually into the system. In some examples, different resource stores may utilize different APIs. In some examples, APIs may be a plug-in to the resource store that translates an internal API of the resource optimization system to one or more external APIs of one or more resource stores. That is, the resource optimization system may communicate with the plug-in using a first API, the plug-in then translates the first API to a second API used by a resource store. This system may enable the resource optimization system to be modular with new resource stores added using a plug-in.

The system may utilize the authentication and/or authorization information supplied in operation 410 to access one or more accounts of the entity to obtain data about resource allocations. In some examples, the resource store stores resources that are available such as money, but in other examples the resource store stores available and used credit resources that are resource obligations that an entity possesses.

At operation 414, the system may receive resource allocation data about the resources of the entity from the resource store contacted at operation 412. This information may be sent programmatically across one or more networks without human intervention using one or more APIs. The resource allocation data may include accounts, balances of accounts, transaction history, or the like.

At operation 416 a determination is made as to whether additional resource stores are to be queried. For example, if an entity has registered ten accounts in ten resource stores, all ten resource stores may be queried. If additional resource stores are to be queried, then operations 412 and 414 are repeated for those additional resource stores.

Once all resource stores are queried, then at operation 418, the system may create a GUI dashboard showing the resource allocations and/or debts across the queried sources. For example, a dashboard shown in FIG. 6. In some examples, the operations of 412-418 may be repeated periodically to enable a real-time, or near real-time tracking and monitoring of resource allocations. In some examples, the GUI is created by creating one or more GUI descriptors, that, when rendered by an entity's computing device, or a computing device of an entity's advisor, creates the GUI.

Figure 5:
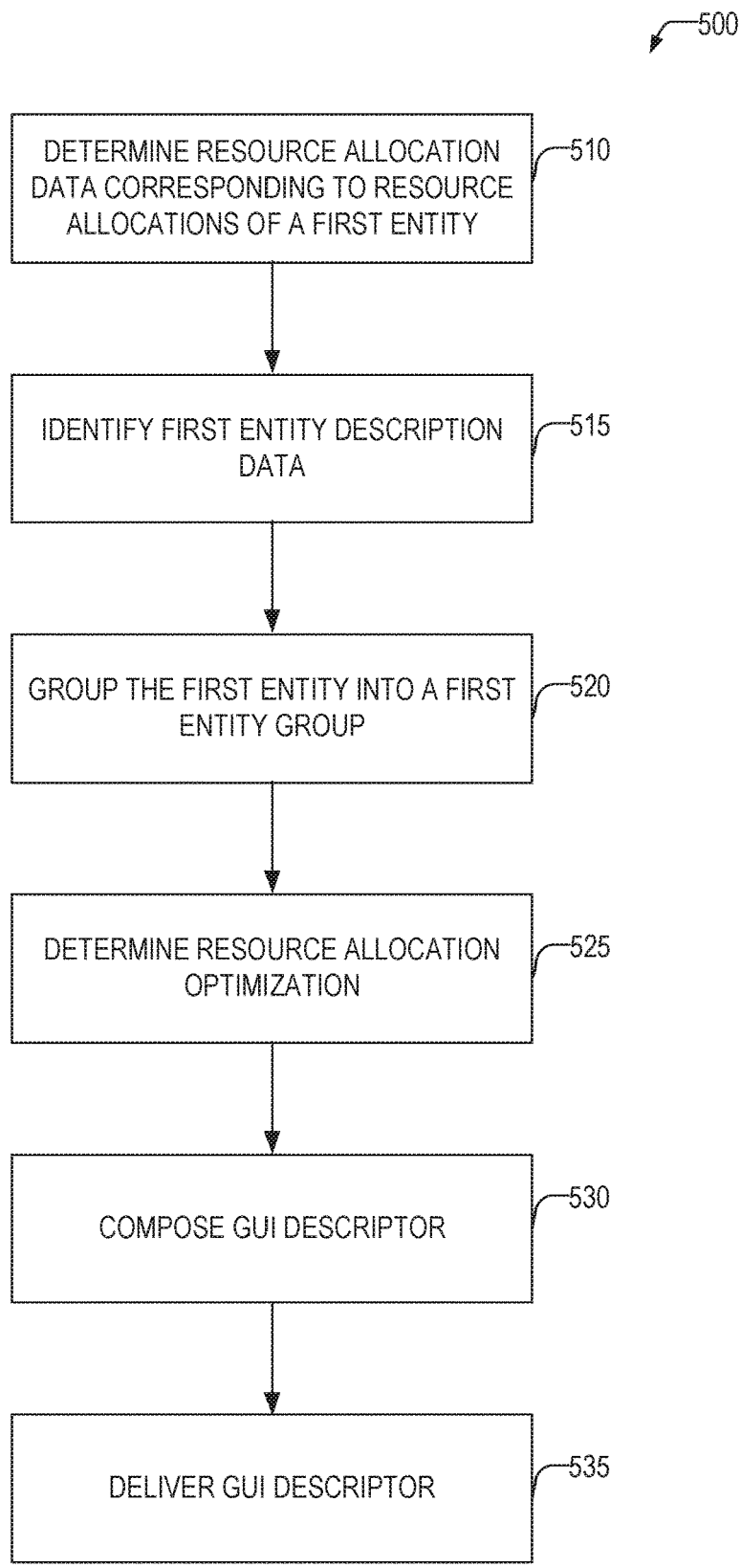
FIG. 5 illustrates a flowchart of a method of providing one or more resource allocation optimizations according to some examples of the present disclosure.

FIG. 5 illustrates a flowchart of a method 500 of providing one or more resource allocation optimizations according to some examples of the present disclosure. At operation 510, the system may determine the resource allocation data corresponding to resource allocations of a first entity. For example, by operations 412-416 of FIG. 4.

At operation 515, the system may identify first entity description data. The Entity description data may be data that is descriptive of an entity and may include entity demographic information, entity resource allocation data, entity resource disbursement data, past entity resource usage data (such as a credit score), and the like. Entity demographic information may include entity name, age, location, marital status, information about children or other dependents (as well as demographic information about the children or dependents), information about spouses or partner, resource optimization goals of the entity, entity social media information, and the like. Entity social media information may be used to determine or infer one or more resource optimization goals, demographic information, and the like. Entity resource availability data may include an amount of resources in one or more resource stores—such as an amount of resources in each particular account, resource replenishment data (e.g., amount and frequency of resources assigned or transferred to the entity), and the like. Example replenishments include paychecks, transfers, gifts, and other irregular or regular income. Replenishment data includes timing (e.g., periodicity) and amount of replenishment as well as which resource stores the resource replenishments are assigned to. Resource disbursement data may any resource obligation that is disbursed from a resource store. For example, bills and obligations such as mortgage payments.

At operation 520, the information obtained from operations 510 and 515 may be used to group the first entity into a first entity group. For example, by using a clustering algorithm that utilizes the resource allocation data and/or the first entity description data. Example algorithms may include multivariate clustering, K-means, or the like. Each cluster may correspond to an entity group. Entity groups may be used for a variety of purposes such as recommending an advisor (e.g., an advisor may be clustered into the group), providing comparison data, and/or providing resource optimization recommendations, or the like.

At operation 525 the system may determine a resource allocation optimization. For example, by utilizing the resource allocation data and/or the entity description data of both the entity for whom the optimization data is being produced as well as other entities within the entity grouping. Example algorithms include rule-based algorithms, decision trees, decision forests, optimization algorithms, Monte-Carlo simulations, and the like.

At operation 530, the system may create one or more GUI descriptors to render a GUI with the resource allocation optimization. At operation 535, the system may deliver the GUI descriptor to a computing device of an entity or a computing device of an advisor of the entity—e.g., over a network.

Figure 6:
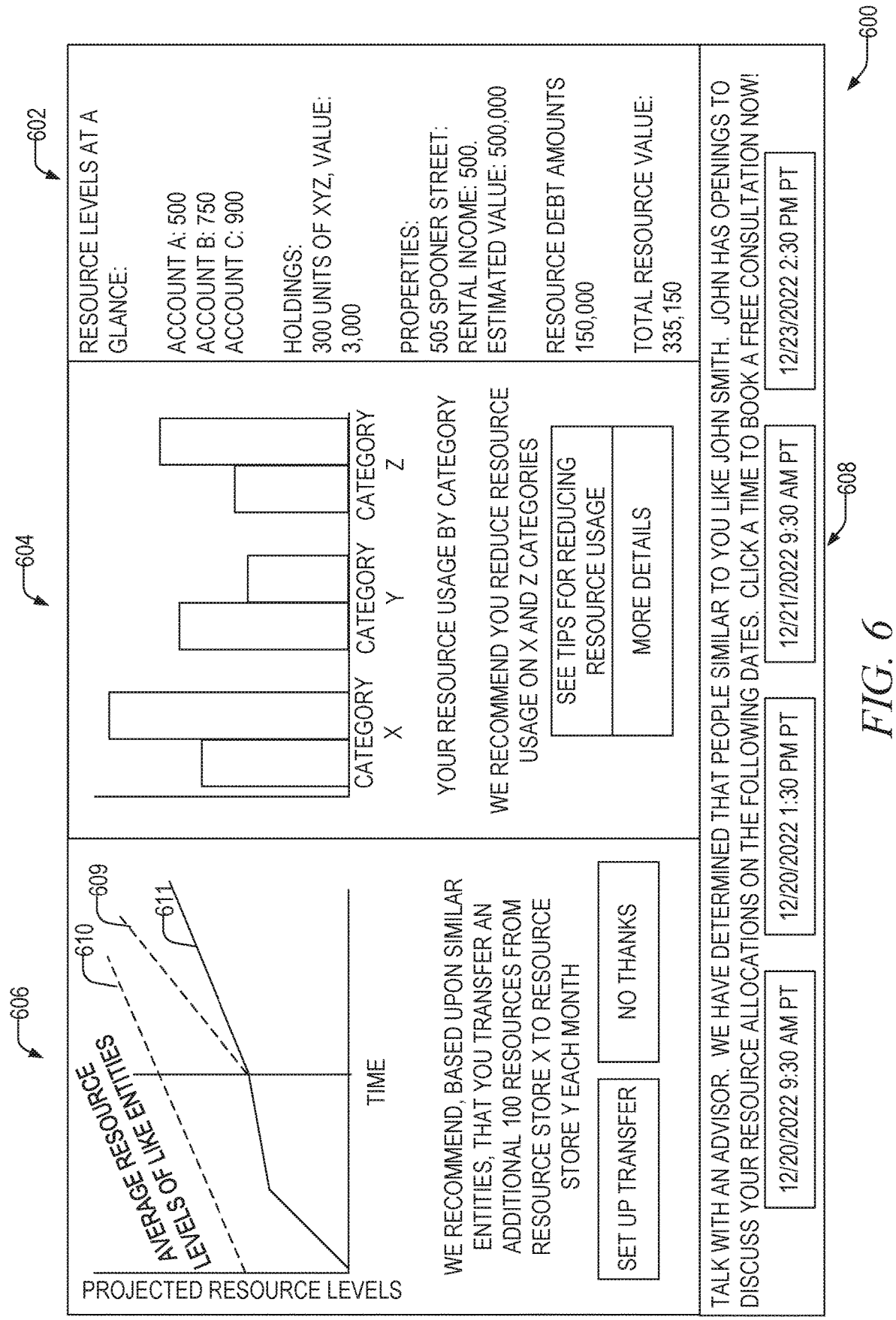
FIG. 6 illustrates a GUI of a dashboard provided by a resource allocation optimization system according to some examples of the present disclosure.

FIG. 6 illustrates a GUI of a dashboard provided by a resource allocation optimization system according to some examples of the present disclosure. Dashboard 600 has four panels 602, 604, 606, and 608. Panel 602 includes a snapshot of resource levels of one or more resource accounts. Examples include savings, checking, credit card accounts, stock accounts, bond accounts, home properties, and the like. In the example panel 602, the system includes resources from three accounts, investment holdings (e.g., 300 units or shares of stock and a valuation of the stock given a current price per unit), real properties, and debt amounts. The system may determine that an entity owns real properties based upon information from the entity (e.g., entered by a user) and may determine an estimated value as well as any rental income (from linked bank accounts) and an estimated value to determine a net value of the real properties (e.g., by contacting an external system). In addition, debt balance amounts such as credit card debt, mortgage debt, personal loans, business loans, and the like may also be shown. A total resource value is then displayed that combines all the resource assets and deducts any liabilities (e.g., mortgage values, credit card debt, personal loans, and the like) to produce a total resource value (e.g., a net-worth).

Panel 604 shows a plurality of resource expenditure categories and a comparison between an average expenditure in that category and the entity for whom the GUI was prepared. Additionally, there is a resource optimization recommendation shown with controls for implementing these strategies or for drilling down to see more details. Additional details include showing specific transactions along with the category assignment for a transaction, and the like.

Panel 606 illustrates a projected resource level of the entity as a function of time on line 611, along with trend line 609 that shows how a level of resources is expected to change should the entity accept the resource allocation optimization suggestion shown in the panel 606. Additionally a line 610 shows the average resource levels for the particular account or goal for the group with which the entity is grouped. As noted, a resource optimization suggestion may be shown along with controls which immediately allow the entity to enact the resource optimization suggestion.

Panel 608 includes a recommendation for a particular advisor (e.g., financial advisor) and selectable controls to book an appointment with the advisor, which are automatically created based upon a schedule and/or availability of the advisor and/or the entity. For example, the entity's calendar data may be determined (e.g., with permission of the user) and cross-referenced against the financial advisor's calendar to find times when both are free.

Figure 8:
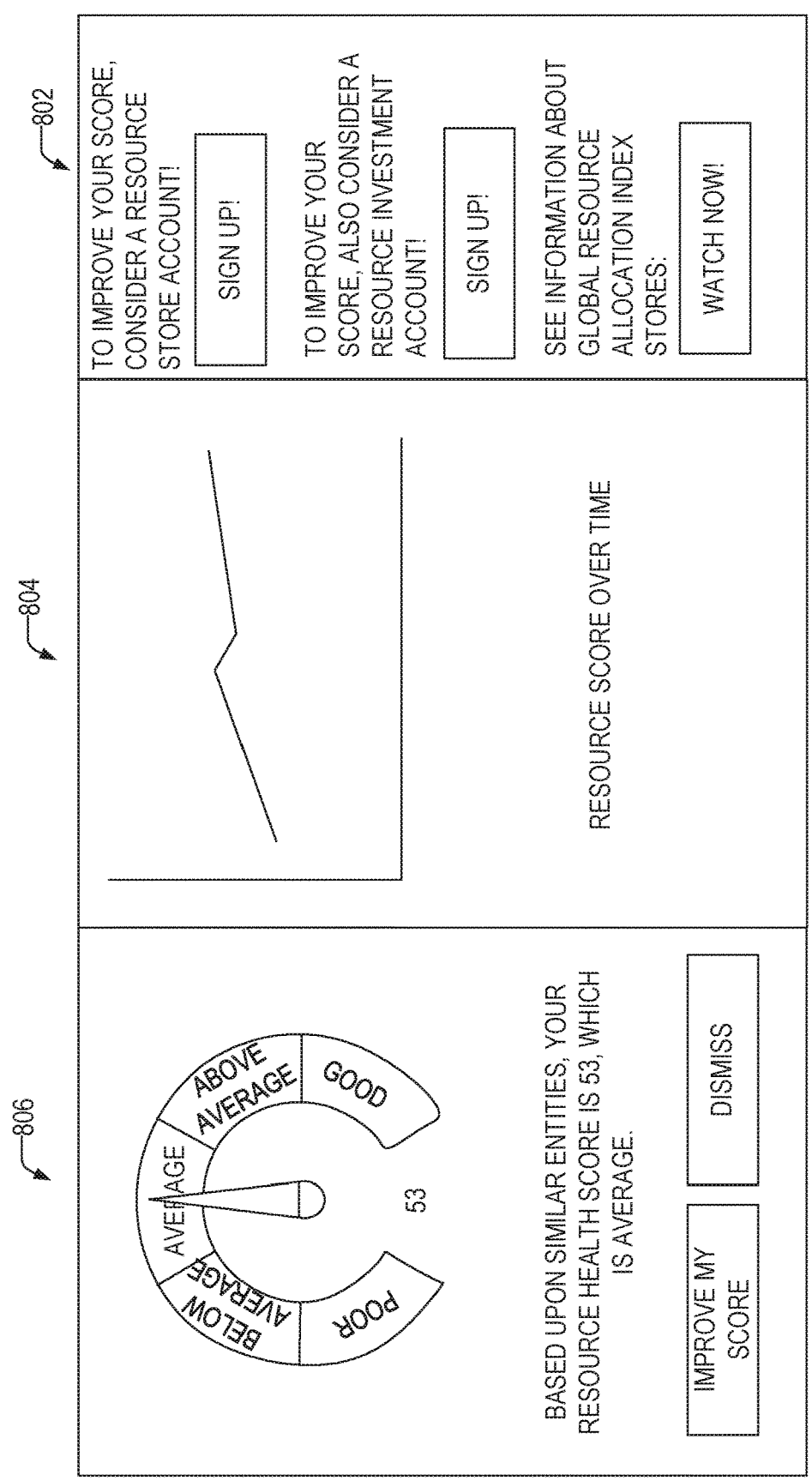
FIG. 8 illustrates a second example of a GUI of a dashboard provided by a resource allocation optimization system according to some examples of the present disclosure.

FIG. 8 illustrates a second example of a GUI 800 of a dashboard provided by a resource allocation optimization system according to some examples of the present disclosure. Panel 806 illustrates a speedometer showing a resource allocation score with a needle pointing toward how that score compares with the entity's group. On the bottom, entities may activate one or more GUI controls that provide resource allocation optimizations to improve the score. Panel 804 may present the resource health score over a period of time so that entities may see how the resource health score changed over time. As noted previously the resource health score may be calculated using machine-learning techniques. Panel 802 displays one or more recommendations for one or more resource allocation optimizations such as signing up for a resource store account or an investment account.

In addition, the system may offer social media videos, whitepapers, financial literacy classes, and the like that are relevant to the entity's resource allocations. For example, based upon one or more recommendation engines. For example, a collaborative filter that utilizes both past behavior of the entity, but also behavior of other entities that are in a same group. For example, content that is consumed by an entity in the entity group may be recommended to other entities in the group. Other examples utilize content-based filtering that utilizes tags applied to content that are matched to items in the entity's resource allocation information.

As noted, the GUIs may be provided to entities and advisors. In other examples, the information produced may be provided to one or more analysts who may utilize this information to improve business strategy, product development, optimize allocation of advisors, and to assist in decision making. In some examples, the information provided may include statistical analysis of the data across one or more groups, group data, individual entity data, and the like. Individual entity data may be shared with the consent of the entity.

In some examples, the individual entity resource allocation information from entities enrolled in the system may be utilized in an artificial intelligence system to allow agents to recommend and/or make better resource investment decisions. In some examples, statistics of groups of one or more entities may be presented to the advisor. Example statistics include total amount of resources, average amount of resources, average resource debt, total resource debt, average amount of resource investments, total amount of resource investments, the types of investments broken down by entity and/or category, and the like.

In some examples, one or more machine-learning models may utilize the resource allocation information from one or more entity groups to provide resource strategies, investment strategies, content recommendations, and the like to the agent. This information may be useful in providing recommendations to one or more clients, or other entities. In some examples, the model may be trained with historical resource information, market information, and the like and labeled with particular investment strategies or content recommendations given near and far term market conditions after the training data. The model may then input current resource allocation data of an entity group and predict one or more future market conditions and/or one or more investment strategies to maximize resource gain given predicted future market conditions. Example models include a recurrent neural network such as a Long-Short Term Memory (LSTM) model.

Entity groups used by the advisor may include the advisor's client entities, all entities enrolled in the system, entities within a certain demographics, and/or the like. In some examples, the advisor may have access and use data from multiple entity groups and may switch between viewing data from different groups using one or more selectable controls.

Figure 7:
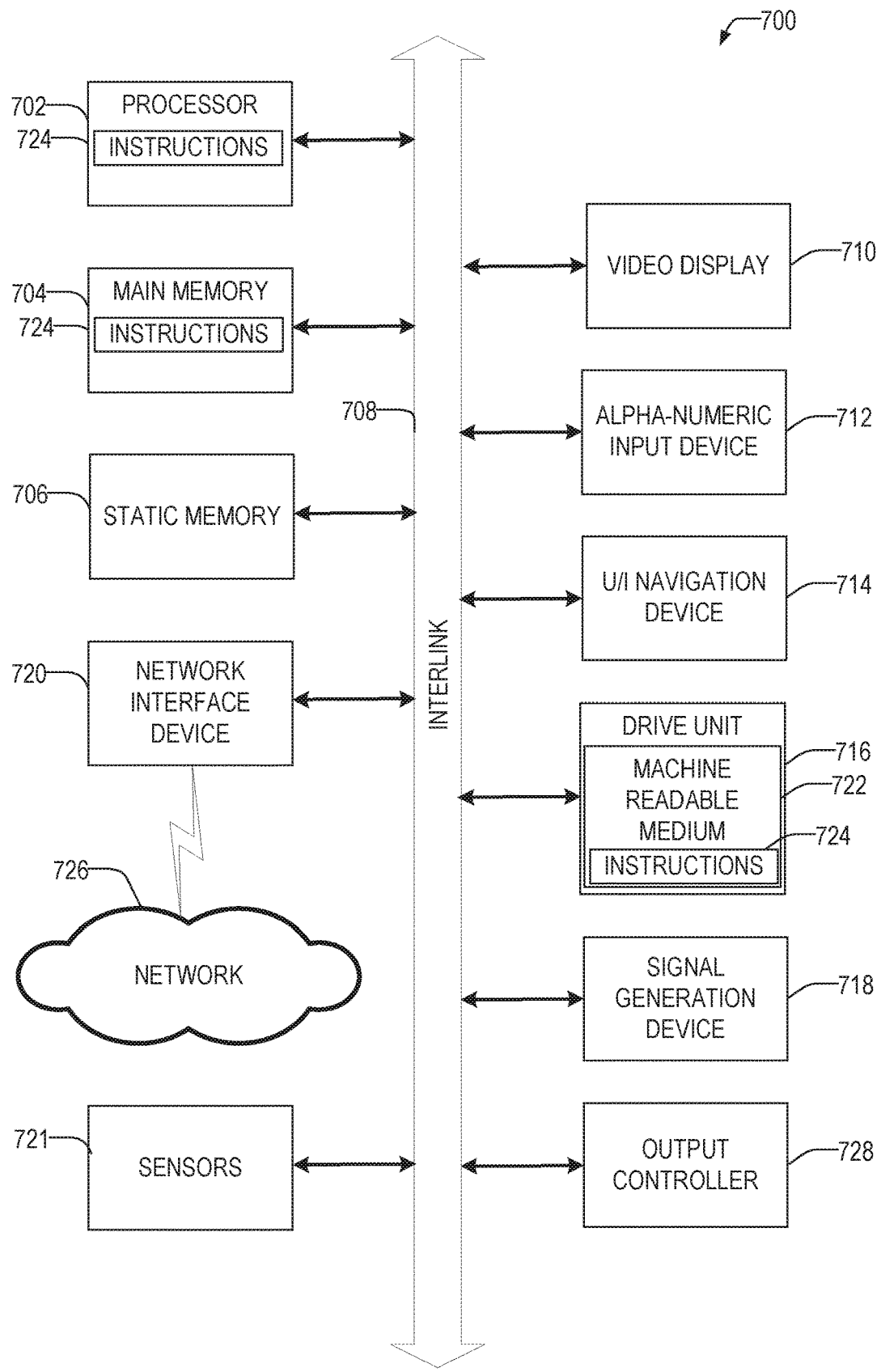
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 700 may be configured to implement the resource store system, entity computing system, entity data system, disbursement data system, resource allocation optimization system, the components of FIGS. 2 and 3, the methods of FIGS. 4 and 5, and to create and display the GUI of FIG. 6. Machine 700 may be so configured using dedicated hardware, software configuring hardware, or a combination of hardware and software.

In some examples, the present techniques allow for the use of gamification as a way of increasing engagement and improving the resource health of an entity. For example, rewards may be given for improving the resource allocations of an entity as well as rewards for improving the relative resource allocation health as compared to other entities in the group, achieving goals, and the like. Rewards may be graphical badges, interactive awards whereby other entities are encouraged to send congratulatory messages, additional resources, and the like.

Examples, as described herein, may include, or may operate on one or more logic units, components, or mechanisms ("components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Other Notes and Examples

Example 1 is a method for resource allocation optimization, the method comprising: using a hardware processor of a network-based service: determining, from a network-based resource allocation service, over a network, resource allocation data corresponding to resource allocations of a first entity; requesting, from a network-based entity data service, over the network, first entity data of the first entity; clustering the first entity into a first entity group based upon the first entity data and second entity data of a second entity in the first entity group, the first entity group one of a plurality of entity groups, the first entity group comprising a plurality of entities; determining a resource allocation optimization, based upon the resource allocation data of the first entity, resource allocation data of a set of other entities in the first entity group, and a resource optimization goal; composing a graphical user interface (GUI) descriptor specifying instructions for rendering a GUI including a description of the resource allocation optimization; and delivering the GUI descriptor to the first entity.

In Example 2, the subject matter of Example 1 includes, receiving third entity data of the first entity from a second network-based service; responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities; determining, based upon the resource allocation data of the first entity, resource allocation data of a second set of other entities in the second entity group, and the resource optimization goal, a second resource allocation optimization; recomposing the GUI descriptor specifying second instructions for rendering the GUI, the GUI including the second resource allocation optimization, but not the resource allocation optimization; and delivering the recomposed GUI descriptor to the first entity.

In Example 3, the subject matter of Examples 1-2 includes, wherein determining, from the network-based resource allocation service, over the network, the resource allocation data corresponding to the resource allocations of the first entity comprises determining resource allocation data from a plurality of different network-based resource allocation services.

In Example 4, the subject matter of Examples 1-3 includes, wherein the network-based entity data service is a social networking service.

In Example 5, the subject matter of Examples 1-4 includes, wherein the GUI is a dashboard showing the resource allocation data of the first entity.

In Example 6, the subject matter of Examples 1-5 includes, receiving an indication from the first entity, via the GUI, to accept the resource allocation optimization; and sending, to the network-based resource allocation service, a request to change a resource allocation of the first entity according to the resource allocation optimization.

In Example 7, the subject matter of Examples 1-6 includes, wherein clustering the first entity into the first entity group comprises utilizing a supervised learning machine-learning algorithm.

In Example 8, the subject matter of Example 7 includes, training the supervised learning machine-learning algorithm using a training data set labelled with an entity group.

Example 9 is a computing device of a network-based service for resource allocation optimization, the computing device comprising: a hardware processor; a memory, storing instructions, which when executed by the hardware processor, cause the computing device to perform operations comprising: determining, from a network-based resource allocation service, over a network, resource allocation data corresponding to resource allocations of a first entity; requesting, from a network-based entity data service, over the network, first entity data of the first entity; clustering the first entity into a first entity group based upon the first entity data and second entity data of a second entity in the first entity group, the first entity group one of a plurality of entity groups, the first entity group comprising a plurality of entities; determining a resource allocation optimization, based upon the resource allocation data of the first entity, resource allocation data of a set of other entities in the first entity group, and a resource optimization goal; composing a graphical user interface (GUI) descriptor specifying instructions for rendering a GUI including a description of the resource allocation optimization; and delivering the GUI descriptor to the first entity.

In Example 10, the subject matter of Example 9 includes, wherein the operations further comprise: receiving third entity data of the first entity from a second network-based service; responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities; determining, based upon the resource allocation data of the first entity, resource allocation data of a second set of other entities in the second entity group, and the resource optimization goal, a second resource allocation optimization; recomposing the GUI descriptor specifying second instructions for rendering the GUI, the GUI including the second resource allocation optimization, but not the resource allocation optimization; and delivering the recomposed GUI descriptor to the first entity.

In Example 11, the subject matter of Examples 9-10 includes, wherein the operations of determining, from the network-based resource allocation service, over the network, the resource allocation data corresponding to the resource allocations of the first entity comprises determining resource allocation data from a plurality of different network-based resource allocation services.

In Example 12, the subject matter of Examples 9-11 includes, wherein the network-based entity data service is a social networking service.

In Example 13, the subject matter of Examples 9-12 includes, wherein the GUI is a dashboard showing the resource allocation data of the first entity.

In Example 14, the subject matter of Examples 9-13 includes, wherein the operations further comprise: receiving an indication from the first entity, via the GUI, to accept the resource allocation optimization; and sending, to the network-based resource allocation service, a request to change a resource allocation of the first entity according to the resource allocation optimization.

In Example 15, the subject matter of Examples 9-14 includes, wherein the operations of clustering the first entity into the first entity group comprises utilizing a supervised learning machine-learning algorithm.

In Example 16, the subject matter of Example 15 includes, wherein the operations further comprise: training the supervised learning machine-learning algorithm using a training data set labelled with an entity group.

Example 17 is a non-transitory machine-readable medium, storing instructions for resource allocation optimization, the instructions, which when executed by a computing device of a network-based service, cause the computing device to perform operations comprising: determining, from a network-based resource allocation service, over a network, resource allocation data corresponding to resource allocations of a first entity; requesting, from a network-based entity data service, over the network, first entity data of the first entity; clustering the first entity into a first entity group based upon the first entity data and second entity data of a second entity in the first entity group, the first entity group one of a plurality of entity groups, the first entity group comprising a plurality of entities; determining a resource allocation optimization, based upon the resource allocation data of the first entity, resource allocation data of a set of other entities in the first entity group, and a resource optimization goal; composing a graphical user interface (GUI) descriptor specifying instructions for rendering a GUI including a description of the resource allocation optimization; and delivering the GUI descriptor to the first entity.

In Example 18, the subject matter of Example 17 includes, wherein the operations further comprise: receiving third entity data of the first entity from a second network-based service; responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities; determining, based upon the resource allocation data of the first entity, resource allocation data of a second set of other entities in the second entity group, and the resource optimization goal, a second resource allocation optimization; recomposing the GUI descriptor specifying second instructions for rendering the GUI, the GUI including the second resource allocation optimization, but not the resource allocation optimization; and delivering the recomposed GUI descriptor to the first entity.

In Example 19, the subject matter of Examples 17-18 includes, wherein the operations of determining, from the network-based resource allocation service, over the network, the resource allocation data corresponding to the resource allocations of the first entity comprises determining resource allocation data from a plurality of different network-based resource allocation services.

In Example 20, the subject matter of Examples 17-19 includes, wherein the network-based entity data service is a social networking service.

In Example 21, the subject matter of Examples 17-20 includes, wherein the GUI is a dashboard showing the resource allocation data of the first entity.

In Example 22, the subject matter of Examples 17-21 includes, wherein the operations further comprise: receiving an indication from the first entity, via the GUI, to accept the resource allocation optimization; and sending, to the network-based resource allocation service, a request to change a resource allocation of the first entity according to the resource allocation optimization.

In Example 23, the subject matter of Examples 17-22 includes, wherein the operations of clustering the first entity into the first entity group comprises utilizing a supervised learning machine-learning algorithm.

In Example 24, the subject matter of Example 23 includes, wherein the operations further comprise: training the supervised learning machine-learning algorithm using a training data set labelled with an entity group.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A method for resource allocation optimization, the method comprising:
   using a hardware processor of a network-based service:
     determining, from a network-based resource allocation service, over a network, resource allocation data corresponding to resource allocations of a first entity;
     requesting, from a network-based entity data service, over the network, first entity data of the first entity;
     clustering the first entity into a first entity group based upon the first entity data and second entity data of a second entity in the first entity group, the first entity group one of a plurality of entity groups, the first entity group comprising a plurality of entities;
     determining a resource allocation optimization, based upon the resource allocation data of the first entity, resource allocation data of a set of other entities in the first entity group, and a resource optimization goal;
     composing a graphical user interface (GUI) descriptor specifying instructions for rendering a GUI including a description of the resource allocation optimization; and
     delivering the GUI descriptor to the first entity.

2. The method of claim 1, further comprising:
   receiving third entity data of the first entity from a second network-based service;
   responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities;
   determining, based upon the resource allocation data of the first entity, resource allocation data of a second set of other entities in the second entity group, and the resource optimization goal, a second resource allocation optimization;
   recomposing the GUI descriptor specifying second instructions for rendering the GUI, the GUI including the second resource allocation optimization, but not the resource allocation optimization; and
   delivering the recomposed GUI descriptor to the first entity.

3. The method of claim 1, wherein determining, from the network-based resource allocation service, over the network, the resource allocation data corresponding to the resource allocations of the first entity comprises determining resource allocation data from a plurality of different network-based resource allocation services.

4. The method of claim 1, wherein the network-based entity data service is a social networking service.

5. The method of claim 1, wherein the GUI is a dashboard showing the resource allocation data of the first entity.

6. The method of claim 1, further comprising:
   receiving an indication from the first entity, via the GUI, to accept the resource allocation optimization; and
   sending, to the network-based resource allocation service, a request to change a resource allocation of the first entity according to the resource allocation optimization.

7. The method of claim 1, wherein clustering the first entity into the first entity group comprises utilizing a supervised learning machine-learning algorithm.

8. The method of claim 7, further comprising:
training the supervised learning machine-learning algorithm using a training data set labelled with an entity group.

9. A computing device of a network-based service for resource allocation optimization, the computing device comprising:
a hardware processor;
a memory, storing instructions, which when executed by the hardware processor, cause the computing device to perform operations comprising:
determining, from a network-based resource allocation service, over a network, resource allocation data corresponding to resource allocations of a first entity;
requesting, from a network-based entity data service, over the network, first entity data of the first entity;
clustering the first entity into a first entity group based upon the first entity data and second entity data of a second entity in the first entity group, the first entity group one of a plurality of entity groups, the first entity group comprising a plurality of entities;
determining a resource allocation optimization, based upon the resource allocation data of the first entity, resource allocation data of a set of other entities in the first entity group, and a resource optimization goal;
composing a graphical user interface (GUI) descriptor specifying instructions for rendering a GUI including a description of the resource allocation optimization; and
delivering the GUI descriptor to the first entity.

10. The computing device of claim 9, wherein the operations further comprise:
receiving third entity data of the first entity from a second network-based service;
responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities;
determining, based upon the resource allocation data of the first entity, resource allocation data of a second set of other entities in the second entity group, and the resource optimization goal, a second resource allocation optimization;
recomposing the GUI descriptor specifying second instructions for rendering the GUI, the GUI including the second resource allocation optimization, but not the resource allocation optimization; and
delivering the recomposed GUI descriptor to the first entity.

11. The computing device of claim 9, wherein the operations of determining, from the network-based resource allocation service, over the network, the resource allocation data corresponding to the resource allocations of the first entity comprises determining resource allocation data from a plurality of different network-based resource allocation services.

12. The computing device of claim 9, wherein the network-based entity data service is a social networking service.

13. The computing device of claim 9, wherein the GUI is a dashboard showing the resource allocation data of the first entity.

14. The computing device of claim 9, wherein the operations further comprise:
receiving an indication from the first entity, via the GUI, to accept the resource allocation optimization; and
sending, to the network-based resource allocation service, a request to change a resource allocation of the first entity according to the resource allocation optimization.

15. The computing device of claim 9, wherein the operations of clustering the first entity into the first entity group comprises utilizing a supervised learning machine-learning algorithm.

16. The computing device of claim 15, wherein the operations further comprise:
training the supervised learning machine-learning algorithm using a training data set labelled with an entity group.

17. A non-transitory machine-readable medium, storing instructions for resource allocation optimization, the instructions, which when executed by a computing device of a network-based service, cause the computing device to perform operations comprising:
determining, from a network-based resource allocation service, over a network, resource allocation data corresponding to resource allocations of a first entity;
requesting, from a network-based entity data service, over the network, first entity data of the first entity;
clustering the first entity into a first entity group based upon the first entity data and second entity data of a second entity in the first entity group, the first entity group one of a plurality of entity groups, the first entity group comprising a plurality of entities;
determining a resource allocation optimization, based upon the resource allocation data of the first entity, resource allocation data of a set of other entities in the first entity group, and a resource optimization goal;
composing a graphical user interface (GUI) descriptor specifying instructions for rendering a GUI including a description of the resource allocation optimization; and
delivering the GUI descriptor to the first entity.

18. The non-transitory machine-readable medium of claim 17, wherein the operations further comprise:
receiving third entity data of the first entity from a second network-based service;
responsive to receiving the third entity data, re-clustering the first entity into a second entity group based upon the first entity data of the first entity, the third entity data of the first entity, and fourth entity data of an entity in the second entity group, the second entity group one of the plurality of entity groups, the second entity group comprising a plurality of entities;
determining, based upon the resource allocation data of the first entity, resource allocation data of a second set of other entities in the second entity group, and the resource optimization goal, a second resource allocation optimization;
recomposing the GUI descriptor specifying second instructions for rendering the GUI, the GUI including the second resource allocation optimization, but not the resource allocation optimization; and
delivering the recomposed GUI descriptor to the first entity.

19. The non-transitory machine-readable medium of claim 17, wherein the operations of determining, from the network-based resource allocation service, over the network, the resource allocation data corresponding to the resource allocations of the first entity comprises determining resource allocation data from a plurality of different network-based resource allocation services.

20. The non-transitory machine-readable medium of claim 17, wherein the network-based entity data service is a social networking service.

* * * * *